US007767116B2

(12) United States Patent
Namba et al.

(10) Patent No.: US 7,767,116 B2
(45) Date of Patent: Aug. 3, 2010

(54) CONDUCTIVE CERAMIC MATERIAL AND PRODUCTION METHOD THEREOF (75) Inventors: Masaharu Namba, Nagoya (JP); Kiyoshi Araki, Nagoya (JP); Naoyuki Ogawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 129 days.

(21) Appl. No.: 12/139,528

(22) Filed: Jun. 16, 2008

(65) Prior Publication Data
US 2009/0075811 A1 Mar. 19, 2009

(30) Foreign Application Priority Data
Jun. 19, 2007 (JP) ............................. 2007-161287
May 19, 2008 (JP) ............................. 2008-130855

(51) Int. Cl.
H01B 1/08 (2006.01)
(52) U.S. Cl. ................. 252/518.1; 252/519.14
(58) Field of Classification Search ............. 252/518.1, 252/519.14; 264/104
See application file for complete search history.

(56) References Cited
U.S. PATENT DOCUMENTS
7,507,289 B2 * 3/2009 Hosono et al. ................. 117/4
2006/0151311 A1 * 7/2006 Hosono et al. ............ 204/157.5
2008/0089826 A1 * 4/2008 Hosono et al. ............... 423/263

FOREIGN PATENT DOCUMENTS
JP 2008-007374 A1 1/2008

OTHER PUBLICATIONS
Kurashige et al "Czochralski Growth of 12Cao-7Al2O3 Crystals", Crystal Growth & Design 2006, vol. 6, No. 7, 1602-05.*
Tanaka et al "Floating zone growth of calcium aluminate (Ca12Al14O33)", Journal of Ceramic Processing Research vol. 6, No. 2, pp. 129-133 (2005).*
Sung Wng Kim et al., "*Simple and Efficient Fabrication of Room Temperature Stable Electride: Melt-Solidification and Glass Ceramics,*" Journal of American Chemical Society, vol. 127, No. 5, 2005, pp. 1370-1371.
Sung Wng Kim et al., "*Synthesis of a Room Temperature Stable $12CaO \cdot 7Al_2O_3$ Electride from the Melt and Its Application as an Electron Field Emitter,*" Journal of Chemical Materials, vol. 18, No. 7, 2006, pp. 1938-1944.

* cited by examiner

Primary Examiner—Mark Kopec
(74) Attorney, Agent, or Firm—Burr & Brown (57) ABSTRACT $12CaO.7Al_2O_3$ polycrystal having high conductivity is provided. The conductivity of the $12CaO.7Al_2O_3$ polycrystal becomes 100 S/cm or more by controlling the nitrogen content in the $12CaO.7Al_2O_3$ polycrystal within a range of 0.3 to 1.1 wt %, and that the conductivity becomes 150 S/cm or more by controlling the nitrogen content within a range of 0.5 to 0.9 wt %.

12 Claims, 4 Drawing Sheets

CONDUCTIVE CERAMIC MATERIAL AND PRODUCTION METHOD THEREOF

CROSS REFERENCE TO RELATED APPLICATION

This application is based upon and claims the benefit of priority from a Japanese Patent Application No. TOKUGAN 2007-161287, filed on Jun. 19, 2007, and a Japanese Patent Application No. TOKUGAN 2008-130855, filed on May 19, 2008; the entire contents of which are incorporated herein by reference.

BACKGROUND OF THE INVENTION

1. Field of the Invention

The present invention relates to a conductive ceramic material and a production method thereof.

2. Description of the Related Art

In recent years, it has been reported that the step of pressure-molding powder of $12CaO.7Al_2O_3$ (hereinafter, written as C12A7) as an oxide having a cage-like crystal structure, and thereafter holding and melting the molded powder at approximately 1600° C. in a reduction atmosphere, followed by annealing and coagulation, is repeated two times, or glass molten in the reduction atmosphere is crystallized in a vacuum atmosphere, whereby C12A7 polycrystal having conductivity of 5 S/cm can be produced (refer to Kim et al., J. Am. Chem. Soc., Vol. 127, pp. 1370-1371 (2005), and Kim et al., Chem. Mater., Vol. 18, pp. 1938-1944 (2006)). Moreover, it has been reported that a dry nitrogen atmosphere is used in the case of melting, annealing and coagulating the molded oxide powder, whereby C12A7 polycrystal having conductivity of approximately 100 S/cm can be produced only by performing the above-described step one time (refer to Japanese Patent Laid-Open Publication No. 2008-7374).

However, in accordance with such production methods as described above, the conductivity of the C12A7 polycrystal at room temperature is not higher than approximately 100 S/cm, which is insufficient. It can be expected that C12A7 polycrystal having sufficient conductivity will be used as a reducer. Moreover, since materials of the C12A7 polycrystal are composed of elements with large Clarke numbers, the C12A7 polycrystal can also be expected as an inexpensive conductive material. Furthermore, it can also be expected that the C12A7 polycrystal will be applied as a field emission electron emitter. Still further, it can also be expected that the C12A7 polycrystal will be applied as an electrode material of an electrochemical device accompanied with oxidation-reduction, and as an electrode for which special joint characteristics are required, such as a charge injection material in an organic EL device. From the above, as a subject, it is eagerly desired to provide the C12A7 polycrystal having the sufficient conductivity.

The present invention has been made in order to achieve the above-described subject. It is an object of the present invention to provide a conductive ceramic material having high conductivity.

It is another object of the present invention to provide a production method of a conductive ceramic material, which is capable of producing the $12CaO.7Al_2O_3$ polycrystal having the high conductivity.

SUMMARY OF THE INVENTION

As a result of repeating an assiduous research, the inventors of the invention of this application found out that an amount of nitrogen in the $12CaO.7Al_2O_3$ polycrystal is controlled within a predetermined range, thus making it possible to produce the $12CaO.7Al_2O_3$ polycrystal having the high conductivity.

A conductive ceramic material according to the present invention contains a predetermined amount of nitrogen, in which a substantial composition of the conductive ceramic material is $12CaO.7Al_2O_3$ in oxide conversion. The predetermined amount is desirably within a range of 0.3 wt % or more to 1.1 wt % or less, more desirably within a range of 0.5 wt % or more to 0.9 wt % or less.

A method for producing a conductive ceramic material according to a first aspect of the present invention includes the steps of: pouring calcium source powder and aluminum source powder into a crucible; mounting a cap on an opening portion of the crucible; introducing the crucible having the cap mounted thereon into a melting furnace; and repeatedly performing, plural times, a treatment of melting the calcium source powder and the aluminum source powder in a dry nitrogen atmosphere in the crucible and cooling and coagulating melted calcium source powder and melted aluminum source powder in a dry nitrogen atmosphere in the crucible. The number of such repetitions is not particularly limited; however, is desirably two to eight times in order to introduce the nitrogen of which the amount ranges from 0.3 wt % or more to 1.1 wt % or less. This is because the nitrogen cannot be introduced sufficiently when the above-described treatment is performed only one time, and because the amount of nitrogen becomes too large when the number of repetitions exceeds eight. In accordance with the method for producing a conductive ceramic material according to the first aspect of the present invention, the $12CaO.7Al_2O_3$ polycrystal having the high conductivity can be produced.

A method for producing a conductive ceramic material according to a second aspect of the present invention includes the steps of: pouring, into a crucible, calcium source powder and aluminum source powder to which at least aluminum nitride is added; mounting a cap on an opening portion of the crucible; introducing the crucible having the cap mounted thereon into a melting furnace; and performing a treatment of melting the calcium source powder and the aluminum source powder in either of a dry nitrogen atmosphere and a dry argon atmosphere in the crucible and cooling and coagulating melted calcium source powder and melted aluminum source powder in either of a dry nitrogen atmosphere and a dry argon atmosphere in the crucible.

As such an additive added in order to introduce the nitrogen, it is desirable to use aluminum nitride, which is a nitride of aluminum that is a component of the $12CaO.7Al_2O_3$. However, the present invention is not limited to this, and for example, nitrides such as silicon nitride and titanium nitride may be used. Moreover, though the loadings of the nitride are not particularly limited, the loadings are desirably within a range of 0.6 wt % or more to 3.5 wt % or less in conversion to the aluminum nitride in the case where the atmosphere is the dry nitrogen atmosphere, and are desirably within a range of 1.6 wt % or more to 4.8 wt % or less in conversion to the aluminum nitride in the case were the atmosphere is the dry argon atmosphere. Furthermore, though the dry argon atmosphere may be replaced by other inert gas atmospheres, the atmosphere is desirably the dry argon atmosphere in terms of cost and handling thereof. In accordance with the method for producing a conductive ceramic material according to the second aspect of the present invention, the $12CaO.7Al_2O_3$ polycrystal having the high conductivity can be produced.

A method for producing a conductive ceramic material according to a third aspect of the present invention includes the steps of: pouring calcium source powder and aluminum source powder into a crucible; mounting a cap on an opening portion of the crucible; introducing the crucible having the cap mounted thereon into a melting furnace; and performing treatment of melting the calcium source powder and the aluminum source powder for two hours or more in a dry nitrogen atmosphere in the crucible and cooling and coagulating melted calcium source powder and melted aluminum source powder in a dry nitrogen atmosphere in the crucible.

Although the melting time of the powders is not particularly limited, the melting time is desirably two hours or more to eight hours or less in order to introduce the nitrogen of which amount ranges from 0.3 wt % or more to 1.1 wt % or less. This is because the nitrogen cannot be introduced sufficiently when the melting time is less than two hours, and because the amount of nitrogen becomes too large when the melting time exceeds eight hours. In accordance with the method for producing a conductive ceramic material according to the third aspect of the present invention, the $12CaO.7Al_2O_3$ polycrystal having the high conductivity can be produced. Moreover, in accordance with the method for producing a conductive ceramic material according to the third aspect of the present invention, it is not necessary to repeat the above-described melting and coagulation plural times in comparison with the method for producing a conductive ceramic material according to the first aspect. Accordingly, the time required for raising and dropping the temperature can be shortened. Furthermore, in accordance with the method for producing a conductive ceramic material according to the third aspect of the present invention, it is not necessary to add aluminum nitride in comparison with the method for producing a conductive ceramic material according to the second aspect. Accordingly, the man-hours needed for producing the conductive ceramic material can be reduced.

A method for producing a conductive ceramic material according to a fourth aspect of the present invention includes the steps of: pouring calcium source powder and aluminum source powder into a crucible; mounting a cap on an opening portion of the crucible; introducing the crucible having the cap mounted thereon into a melting furnace; performing treatment of melting the calcium source powder and the aluminum source powder in a dry nitrogen atmosphere in the crucible and cooling and coagulating melted calcium source powder and melted aluminum source powder in a dry nitrogen atmosphere in the crucible; and annealing a coagulation, which is obtained by the treatment, in the dry nitrogen atmosphere.

The temperature of the coagulation may be directly set at an annealing temperature after the coagulation is obtained. Alternatively, the coagulation may be cooled down to room temperature and then be heated up to the annealing temperature. It is desirable that the annealing temperature be approximately 1400° C. since the coagulation is molten when the annealing temperature is 1450° C. or more, and the nitrogen cannot be introduced sufficiently when the annealing temperature is 1350° C. or less. The time of annealing the coagulation is not particularly limited; however, in order to introduce the nitrogen sufficiently, such an annealing time is preferably 24 hours or more, more preferably 48 hours or more.

In accordance with the method for producing a conductive ceramic material according to the fourth aspect of the present invention, the $12CaO.7Al_2O_3$ polycrystal having the high conductivity can be produced. Moreover, in accordance with the method for producing a conductive ceramic material according to the fourth aspect of the present invention, it is not necessary to repeat the above-described melting and coagulation a plural number of times in comparison with the method for producing a conductive ceramic material according to the first aspect. Accordingly, the time required for raising and dropping the temperature can be shortened. Furthermore, in accordance with the method for producing a conductive ceramic material according to the fourth aspect of the present invention, the time of holding the above-described powders at a high temperature can be shortened in comparison with the methods for producing a conductive ceramic material according to the second and third aspects. Still further, in accordance with the method for producing a conductive ceramic material according to the fourth aspect of the present invention, the nitrogen can be introduced in a state where the material is formed into a predetermined shape in advance.

The above-described calcium source may be any as long as it is a substance containing calcium, such as calcium carbonate, calcium hydroxide, calcium oxide, and calcium oxalate. However, when the control of the amount of nitrogen is taken into consideration, it is desirable to use the calcium carbonate that is advantageous in being weighed because of chemical stability thereof and does not generate water at the time of being heated.

The above-described aluminum source may be any as long as it is a substance containing aluminum, such as aluminum oxide, aluminum hydroxide, and aluminum nitride. However, when the control of the amount of nitrogen is taken into consideration, it is desirable to use the aluminum oxide or the aluminum nitride, which is advantageous in being weighed because of chemical stability thereof and does not generate water at the time of being heated.

The shape of the crucible is not particularly limited, and may be a planar shape that makes it possible to introduce the nitrogen efficiently into the crucible in such a manner that an interface between the gas and the crucible concerned is expanded, or may be a three-dimensional shape that makes it possible to pour the powders into the crucible with ease. Moreover, the powders may be poured into the crucible in a state of powder that is less treated, or may be formed into a shape of a pressed powder body pourable into the crucible with high density in order to produce a larger amount of the conductive ceramic material in one process.

The pressure and purity of the nitrogen in the above-described dry nitrogen atmosphere are not particularly limited; however, the pressure and the purity are preferably higher. In order to introduce the nitrogen efficiently, the purity of the nitrogen is preferably 80.0% or more, more preferably 99.9% or more, for example, under the atmospheric pressure. Moreover, the pressure of the atmosphere may be increased in order to introduce the nitrogen. Moreover, the atmospheric gas may be any as long as it is provided in order to introduce the nitrogen, and gas other than the nitrogen gas, such as ammonia gas, may be used.

BRIEF DESCRIPTION OF THE DRAWINGS

Examples of the invention will become more fully apparent from the following description and appended claims, taken in conjunction with the accompanying drawings. Understanding that these drawings depict only examples and are, therefore, not to be considered limiting of the invention's scope, the examples of the invention will be described with additional specificity and detail through use of the accompanying drawings in which:

DETAILED DESCRIPTION OF THE INVENTION

A description will be made below of embodiments of the present invention.

Example 1-1

In Example 1-1, first, commercially available calcium carbonate powder (specific surface area: 5.5 m$^2$/g) and commercially available aluminum oxide powder (specific surface area: 141 m$^2$/g) were weighed in a molar ratio of 12.0:7.0, and these powders were wet-mixed by a water medium, were then dried, and thereafter, were passed through a sieve, whereby mixed powder was obtained. Next, the mixed powder was subjected to heat treatment in an ambient atmosphere of 1200° C. for four hours, whereby a solid-phase reaction was caused therein, and C12A7 powder was synthesized. Note that it was confirmed whether or not the mixed powder was synthesized into the C12A7 powder based on an X-ray diffraction diagram of the powder after such solid-phase synthesis.

Next, pellets and powder, which were formed by uniaxially pressing the C12A7 powder, were filled into a graphite crucible (inner size: ø40×H 70 mm), on an inner surface of which a commercially available graphite sheet (trade name: Grafoil) was laid. Thereafter, a graphite-made cap was mounted on an opening portion of the graphite crucible. Note that, at this time, ventilation between an inside and outside of the graphite crucible was ensured by a gap between the graphite crucible and the cap. Next, the graphite crucible was put into a graphite crucible with a cap, which was similar to the above-described graphite crucible but was a little larger than the above-described graphite crucible. Then, such a double crucible was put into a commercially available carbon furnace. Subsequently, treatment of cooling down the carbon furnace to room temperature after performing melting treatment for the pellets and the powder at 1600° C. for one hour in a dry nitrogen atmosphere was performed repeatedly two times. A cooling rate of the carbon furnace was 300° C./h.

Figure 1:
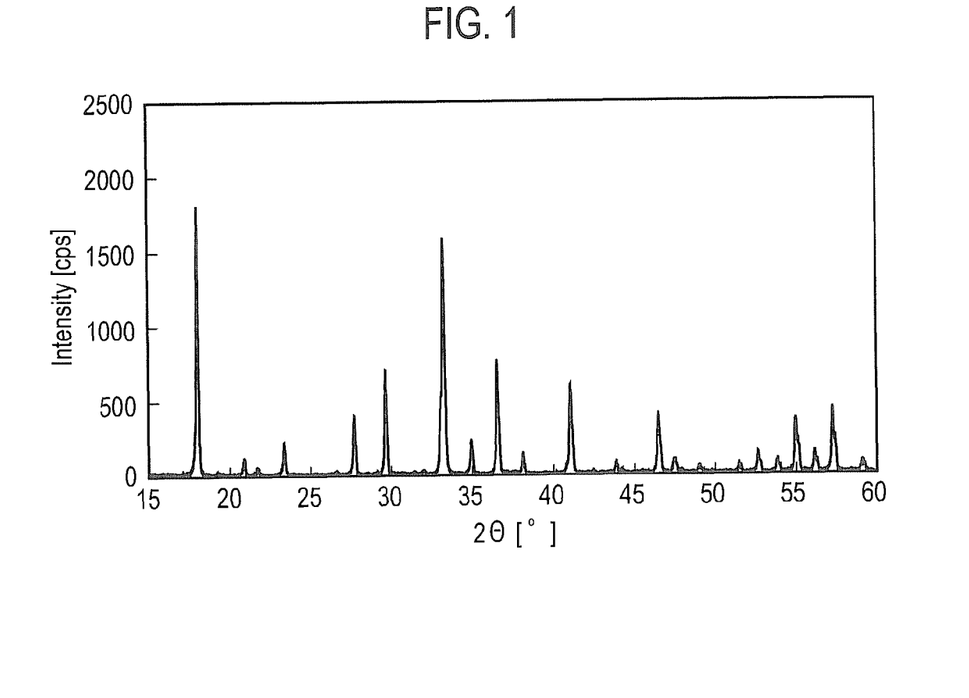
FIG. 1 is an X-ray diffraction diagram obtained from powder of Example 1-1 after solid-phase synthesis.
Figure 2:
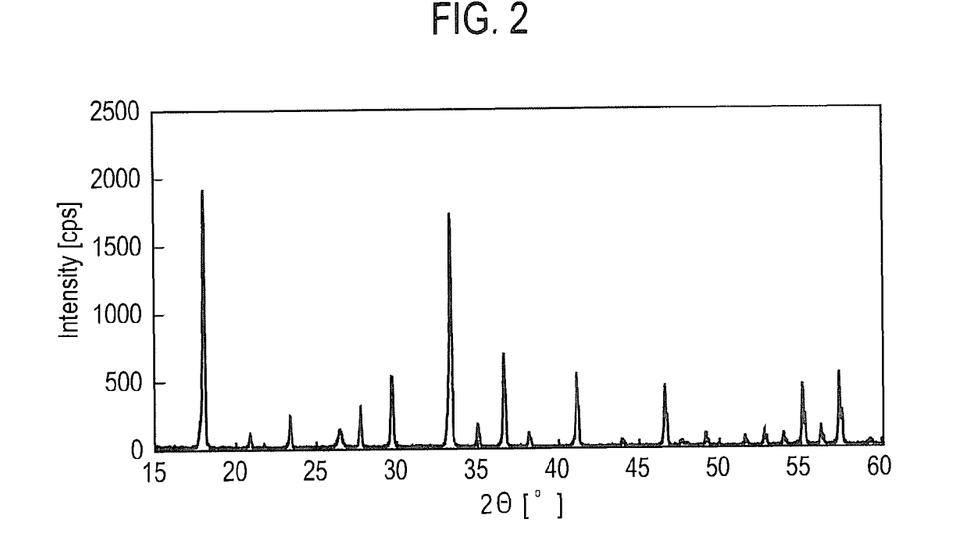
FIG. 2 is an X-ray diffraction diagram obtained from the powder of Example 1-1 after melting/coagulation treatment is performed two times.

Next, a molten coagulation thus formed was taken out of the graphite crucible (double crucible). At this time, the molten coagulation and the graphite crucible were not fixedly adhered to each other, and the molten coagulation was able to be taken out of the graphite crucible with ease. However, the graphite sheet was adhered onto a curved surface of the molten coagulation, which was in contact with the graphite crucible. Next, the graphite sheet on the surface of the molten coagulation was removed by machining. Thereafter, a sample thus obtained was crushed, a part thereof was further crushed into powder, and a phase of the powder was determined by X-ray diffraction. Then, a C12A7 phase was observed (refer to FIG. 2). Moreover, this powder exhibited a deep green color. Furthermore, conduction of a fractured surface of the crushed sample was investigated by a commercially available tester or a commercially available megohmmeter. Then, the conduction was recognized, and conductivity of the fractured surface was 125 S/cm. Moreover, when a nitrogen content in the powder was quantitated by chemical analysis, the nitrogen content was 0.34 wt %.

Example 1-2

In Example 1-2, a sample was obtained in a similar way to Example 1-1 except that the treatment of cooling down the carbon furnace to the room temperature after performing the melting treatment at 1600° C. for one hour in the dry nitrogen atmosphere was repeated four times. The graphite sheet on the surface of the molten coagulation was removed by the machining, and thereafter, the sample was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 190 S/cm. Moreover, when a nitrogen content in the powder was quantitated by the chemical analysis, the nitrogen content was 0.79 wt %.

Example 1-3

In Example 1-3, a sample was obtained in a similar way to Example 1-1 except that the treatment of cooling down the carbon furnace to the room temperature after performing the melting treatment at 1600° C. for one hour in the dry nitrogen atmosphere was repeated eight times. The graphite sheet on the surface of the molten coagulation was removed by the machining, and thereafter, the sample was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 130 S/cm. Moreover, when a nitrogen content in the powder was quantitated by the chemical analysis, the nitrogen content was 0.96 wt %.

Example 2-1

In Example 2-1, first, commercially available calcium carbonate powder (specific surface area: 5.5 m$^2$/g), commercially available aluminum oxide powder (specific surface area: 141 m$^2$/g) and commercially available aluminum nitride powder (specific surface area: 2.6 m$^2$/g) were weighed in a molar ratio of 12.0:6.9:0.2. Among them, the calcium carbonate powder and the aluminum oxide powder were wet-mixed by a water medium, were then dried, and thereafter, were passed through the sieve, whereby mixed powder was obtained. Next, the mixed powder was subjected to the heat treatment in the ambient atmosphere of 1200° C. for four hours, whereby the solid-phase reaction was caused therein, and powder containing C12A7 was synthesized. Next, the powder containing C12A7 and the aluminum nitride powder were dry-mixed, whereby mixed powder was obtained.

Next, pellets and powder, which were formed by uniaxially pressing the mixed powder, were filled into the graphite crucible (inner size: ø40×H 70 mm), on the inner surface of which the commercially available graphite sheet (trade name: Grafoil) was laid. Thereafter, the graphite-made cap was mounted on the opening portion of the graphite crucible. Note that, at this time, the ventilation between the inside and outside of the graphite crucible was ensured by the gap between the graphite crucible and the cap. Next, the graphite crucible was put into the graphite crucible with the cap, which was similar to the above-described graphite crucible but was a little larger than the above-described graphite crucible. Then, the double crucible was put into the commercially available carbon furnace. Subsequently, the melting treatment was performed for the pellets and the powder at 1600° C. for one hour in the dry nitrogen atmosphere, and thereafter, the carbon furnace was cooled down to the room temperature. The cooling rate of the carbon furnace was 300° C./h.

Figure 3:
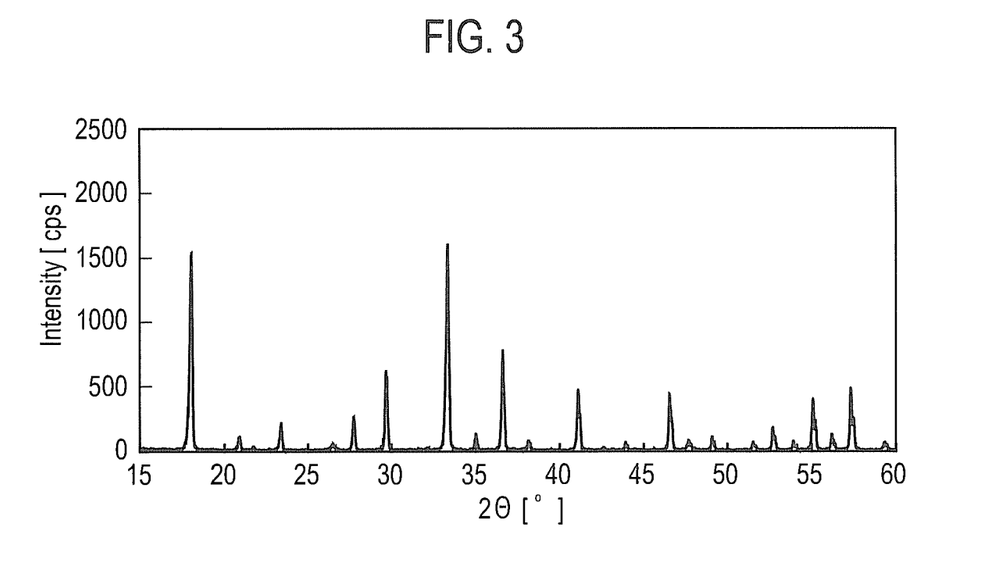
FIG. 3 is an X-ray diffraction diagram obtained from powder of Example 2-1 after the melting/coagulation treatment is performed one time.

Next, a molten coagulation thus formed was taken out of the graphite crucible. At this time, the molten coagulation and the graphite crucible were not fixedly adhered to each other, and the molten coagulation was able to be taken out of the graphite crucible with ease. However, the graphite sheet was adhered onto the curved surface of the molten coagulation, which was in contact with the graphite crucible. Next, the graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed (refer to FIG. 3). Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 120 S/cm. Moreover, when a nitrogen content in the powder was quantitated by the chemical analysis, the nitrogen content was 0.32 wt %.

Example 2-2

In Example 2-2, a sample was obtained in a similar way to Example 2-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 12.0:6.8:0.4. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 150 S/cm. Moreover, when a nitrogen content in the powder was quantitated by the chemical analysis, the nitrogen content was 0.45 wt %.

Example 2-3

In Example 2-3, a sample was obtained in a similar way to Example 2-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 12.0:6.6:0.8. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 180 S/cm. Moreover, when a nitrogen content in the powder was quantitated by the chemical analysis, the nitrogen content was 0.61 wt %.

Example 2-4

In Example 2-4, a sample was obtained in a similar way to Example 2-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 24.0:13.1:1.8. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 200 S/cm. Moreover, when a nitrogen content in the powder was quantitated by the chemical analysis, the nitrogen content was 0.73 wt %.

Example 2-5

In Example 2-5, a sample was obtained in a similar way to Example 2-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 12.0:6.4:1.2. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed.

Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 110 S/cm. Moreover, when a nitrogen content in the powder was quantitated by the chemical analysis, the nitrogen content was 1.10 wt %.

Example 3-1

Figure 4:
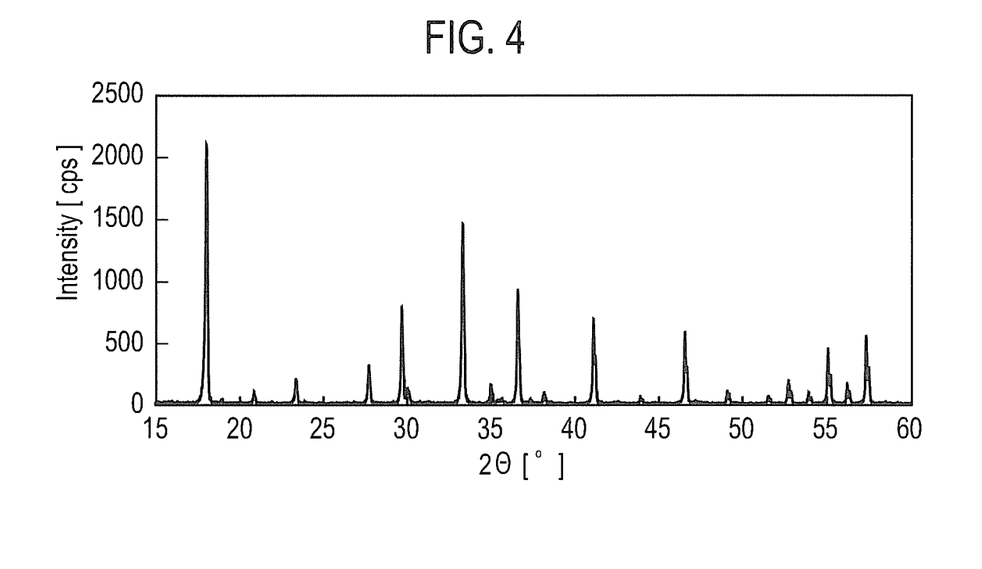
FIG. 4 is an X-ray diffraction diagram obtained from powder of Example 3-1 after the melting/coagulation treatment is performed one time.

In Example 3-1, a sample was obtained in a similar way to Example 2-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 24.0:13.5:1.0, and that the atmosphere at the time of the melting treatment was changed to a dry argon atmosphere. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed (FIG. 4). Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 105 S/cm. Moreover, when a nitrogen content in the powder was quantitated by the chemical analysis, the nitrogen content was 0.31 wt %.

Example 3-2

In Example 3-2, a sample was obtained in a similar way to Example 3-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 12.0:6.6:0.8. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 170 S/cm. Moreover, when a nitrogen content in the powder was quantitated by the chemical analysis, the nitrogen content was 0.49 wt %.

Example 3-3

In Example 3-3, a sample was obtained in a similar way to Example 3-1 except that the commercially available calcium carbonate powder (specific surface area: 5.5 m$^2$/g), the commercially available aluminum oxide powder (specific surface area: 141 m$^2$/g) and the commercially available aluminum nitride powder (specific surface area: 2.6 m$^2$/g) were weighed in a molar ratio of 12.0:6.2:1.6. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 140 S/cm. Moreover, when a nitrogen content in the powder was quantitated by the chemical analysis, the nitrogen content was 0.92 wt %.

Example 4-1

In Example 4-1, first, commercially available calcium carbonate powder (specific surface area: 5.5 m$^2$/g) and commercially available aluminum oxide powder (specific surface area: 141 m$^2$/g) were weighed in a molar ratio of 12.0:7.0, and these powders were wet-mixed by a water medium, were then dried, and thereafter, were passed through the sieve, whereby mixed powder was obtained. Next, the mixed powder was subjected to the heat treatment in the ambient atmosphere of 1200° C. for four hours, whereby the solid-phase reaction was caused therein, and powder containing C12A7 was synthesized. Note that it was confirmed whether or not the mixed powder was synthesized into the C12A7 powder based on an X-ray diffraction diagram of the powder after such solid-phase synthesis.

Next, pellets and powder, which were formed by uniaxially pressing the C12A7 powder, were filled into the graphite crucible (inner size: ø40×H 70 mm), on the inner surface of which the commercially available graphite sheet (trade name: Grafoil) was laid. Thereafter, the graphite-made cap was mounted on the opening portion of the graphite crucible. Note that, at this time, the ventilation between the inside and outside of the graphite crucible was ensured by the gap between the graphite crucible and the cap. Next, the graphite crucible was put into the graphite crucible with the cap, which was similar to the above-described graphite crucible but was a little larger than the above-described graphite crucible. Then, the double crucible was put into the commercially available carbon furnace. Subsequently, the melting treatment was performed for the pellets and the powder at 1600° C. for two hours in the dry nitrogen atmosphere, and thereafter, the carbon furnace was cooled down to the room temperature. The cooling rate of the carbon furnace was 300° C./h.

Next, a molten coagulation thus formed was taken out of the graphite crucible. At this time, the molten coagulation and the graphite crucible were not fixedly adhered to each other, and the molten coagulation was able to be taken out of the graphite crucible with ease. However, the graphite sheet was adhered onto the curved surface of the molten coagulation, which was in contact with the graphite crucible. Next, the graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 123 S/cm. Moreover, when a nitrogen content in the powder was quantitated by the chemical analysis, the nitrogen content was 0.33 wt %.

Example 4-2

In Example 4-2, a sample was obtained in a similar way to Example 4-1 except that the carbon furnace was cooled down to the room temperature after the melting treatment was performed at 1600° C. for four hours in the dry nitrogen atmosphere. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 169 S/cm. Moreover, when a nitrogen content in the powder was quantitated by the chemical analysis, the nitrogen content was 0.49 wt %.

Example 4-3

In Example 4-3, a sample was obtained in a similar way to Example 4-1 except that the carbon furnace was cooled down to the room temperature after the melting treatment was performed at 1600° C. for eight hours in the dry nitrogen atmosphere. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 130 S/cm. Moreover, when a nitrogen content in the powder was quantitated by the chemical analysis, the nitrogen content was 0.93 wt %.

Example 4-4

In Example 4-4, a sample was obtained in a similar way to Example 4-1 except that the treatment of cooling down the carbon furnace to the room temperature after performing the melting treatment at 1600° C. for one hour in the dry nitrogen atmosphere was performed repeatedly two times. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 125 S/cm. Moreover, when a nitrogen content in the powder was quantitated by the chemical analysis, the nitrogen content was 0.40 wt %.

Example 4-5

In Example 4-5, a sample was obtained in a similar way to Example 4-1 except that the treatment of cooling down the carbon furnace to the room temperature after performing the melting treatment at 1600° C. for two hours in the dry nitrogen atmosphere was performed repeatedly two times. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 155 S/cm. Moreover, when a nitrogen content in the powder was quantitated by the chemical analysis, the nitrogen content was 0.47 wt %.

Example 4-6

In Example 4-6, a sample was obtained in a similar way to Example 4-1 except that the treatment of cooling down the carbon furnace to the room temperature after performing the melting treatment at 1600° C. for four hours in the dry nitrogen atmosphere was performed repeatedly two times. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 122 S/cm. Moreover, when a nitrogen content in the powder was quantitated by the chemical analysis, the nitrogen content was 1.01 wt %.

Example 5-1

In Example 5-1, first, commercially available calcium carbonate powder (specific surface area: 5.5 $m^2/g$) and commercially available aluminum oxide powder (specific surface area: 141 $m^2/g$) were weighed in a molar ratio of 12.0:7.0, and these powders were wet-mixed by a water medium, were then dried, and thereafter, were passed through the sieve, whereby mixed powder was obtained. Next, the mixed powder was subjected to the heat treatment in the ambient atmosphere of 1200° C. for four hours, whereby the solid-phase reaction was caused therein, and the C12A7 powder was synthesized. Note that it was confirmed whether or not the mixed powder was synthesized into the C12A7 powder based on the X-ray diffraction diagram of the powder after such solid-phase synthesis.

Next, pellets and powder, which were formed by uniaxially pressing the C12A7 powder, were filled into the graphite crucible (inner size: ø40×H 70 mm), on the inner surface of which the commercially available graphite sheet (trade name: Grafoil) was laid. Thereafter, the graphite-made cap was mounted on the opening portion of the graphite crucible. Note that, at this time, the ventilation between the inside and outside of the graphite crucible was ensured by the gap between the graphite crucible and the cap. Next, the graphite crucible was put into the graphite crucible with the cap, which was similar to the above-described graphite crucible but was a little larger than the above-described graphite crucible. Then, the double crucible was put into the commercially available carbon furnace. Subsequently, there was performed treatment of melting the pellets and the powder at 1600° C. for one hour in the dry nitrogen atmosphere, then coagulating the pellets and the powder, and annealing a formed coagulation at 1400° C. for 24 hours. Thereafter, the carbon furnace was cooled down to the room temperature. The cooling rate of the carbon furnace was 300° C./h.

Next, the molten coagulation thus formed was taken out of the graphite crucible. At this time, the molten coagulation and the graphite crucible were not fixedly adhered to each other, and the molten coagulation was able to be taken out of the graphite crucible with ease. However, the graphite sheet was adhered onto the curved surface of the molten coagulation, which was in contact with the graphite crucible. Next, the graphite sheet on the surface of the molten coagulation was removed by the machining. Thereafter, a sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 121 S/cm. Moreover, when a nitrogen content in the powder was quantitated by the chemical analysis, the nitrogen content was 0.32 wt %.

Example 5-2

In Example 5-2, a sample was obtained in a similar way to Example 5-1 except that the annealing time was changed to 48 hours. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 186 S/cm. Moreover, when a nitrogen content in the powder was quantitated by the chemical analysis, the nitrogen content was 0.71 wt %.

Example 5-3

In Example 5-3, a sample was obtained in a similar way to Example 5-1 except that the melting time was changed to four hours. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 216 S/cm. Moreover, when a nitrogen content in the powder was quantitated by the chemical analysis, the nitrogen content was 0.67 wt %.

Example 5-4

In Example 5-4, a sample was obtained in a similar way to Example 5-3 except that the annealing time was changed to 48 hours. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 220 S/cm. Moreover, when a nitrogen content in the powder was quantitated by the chemical analysis, the nitrogen content was 0.85 wt %.

Comparative Example 1-1

In Comparative example 1-1, a sample was obtained in a similar way to Example 1-1 except that the treatment of cooling down the carbon furnace to the room temperature after performing the melting treatment at 1600° C. for one hour in the dry nitrogen atmosphere was performed only one time. The graphite sheet on the surface of the molten coagulation was removed by the machining, and thereafter, the sample was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 50 S/cm. Moreover, when a nitrogen content in the powder was quantitated by the chemical analysis, the nitrogen content was 0.23 wt %.

Comparative example 1-2

In Comparative example 1-2, a sample was obtained in a similar way to Example 1-1 except that the treatment of cooling down the carbon furnace to the room temperature after performing the melting treatment at 1600° C. for one hour in the dry nitrogen atmosphere was repeated 12 times. The graphite sheet on the surface of the molten coagulation was removed by the machining, and thereafter, the sample was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 95 S/cm. Moreover, when a nitrogen content in the powder was quantitated by the chemical analysis, the nitrogen content was 1.15 wt %.

Comparative Example 2-1

In Comparative example 2-1, a sample was obtained in a similar way to Example 2-1 except that the commercially available calcium carbonate powder (specific surface area: 5.5 $m^2/g$), the commercially available aluminum oxide powder (specific surface area: 141 $m^2/g$) and the commercially available aluminum nitride powder (specific surface area: 2.6 $m^2/g$) were weighed in a molar ratio of 24.0:13.9:0.2. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 65

S/cm. Moreover, when a nitrogen content in the powder was quantitated by the chemical analysis, the nitrogen content was 0.25 wt %.

Comparative Example 2-2

In Comparative example 2-2, a sample was obtained in a similar way to Example 2-1 except that the commercially available calcium carbonate powder (specific surface area: 5.5 m²/g), the commercially available aluminum oxide powder (specific surface area: 141 m²/g) and the commercially available aluminum nitride powder (specific surface area: 2.6 m²/g) were weighed in a molar ratio of 12.0:6.0:2.0. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 50 S/cm. Moreover, when a nitrogen content in the powder was quantitated by the chemical analysis, the nitrogen content was 1.35 wt %.

Comparative Example 3-1

Figure 5:
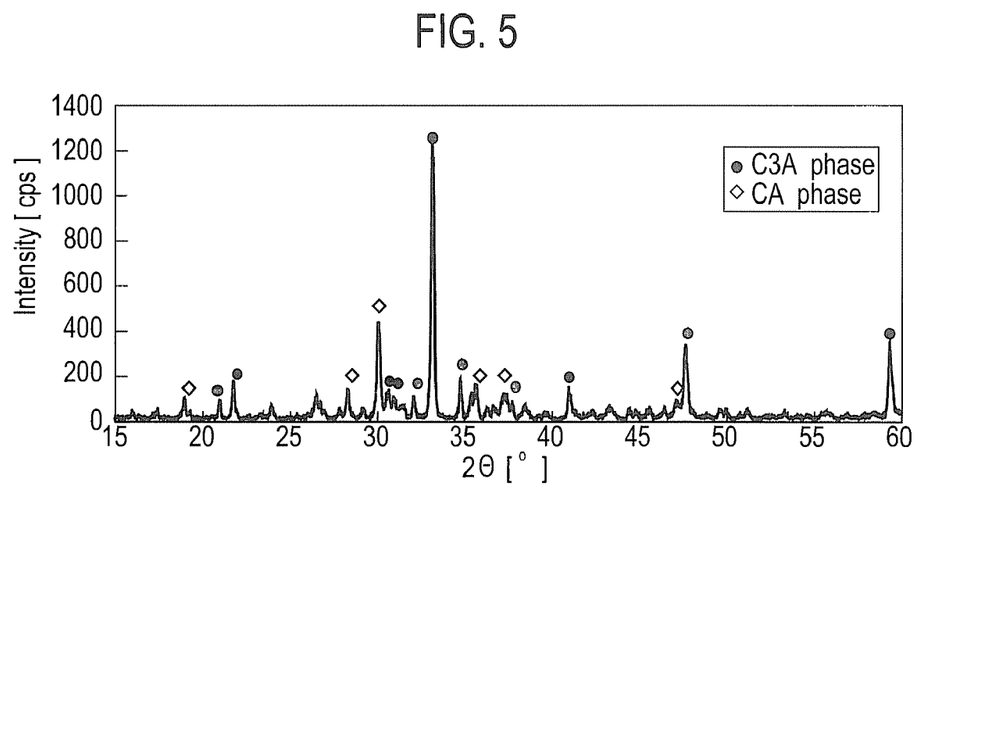
FIG. 5 is an X-ray diffraction diagram obtained from the powder of Example 3-1 after the melting/coagulation treatment is performed one time.

In Comparative example 3-1, a sample was obtained in a similar way to Example 3-1 except that the commercially available calcium carbonate powder (specific surface area: 5.5 m²/g), the commercially available aluminum oxide powder (specific surface area: 141 m²/g) and the commercially available aluminum nitride powder (specific surface area: 2.6 m²/g) were weighed in a molar ratio of 12.0:7.0:0.0. The graphite sheet on the surface of the molten coagulation was removed by the machining. Thereafter, the sample thus obtained was crushed, a part thereof was further crushed into powder, and a phase of the powder was determined by the X-ray diffraction. Then, a C3A ($3CaO.Al_2O_3$) phase and a CA ($CaO.Al_2O_3$) phase were observed (FIG. 5). Moreover, this powder exhibited a deep green color. Furthermore, conduction of a fractured surface of the crushed sample was investigated by the commercially available tester or the commercially available megohmmeter. Then, the conduction was not recognized. Moreover, when a nitrogen content in the powder was quantitated by the chemical analysis, the nitrogen content was less than 0.01 wt %.

Comparative Example 3-2

In Comparative example 3-2, a sample was obtained in a similar way to Example 3-1 except that the commercially available calcium carbonate powder (specific surface area: 5.5 m²/g), the commercially available aluminum oxide powder (specific surface area: 141 m²/g) and the commercially available aluminum nitride powder (specific surface area: 2.6 m²/g) were weighed in a molar ratio of 24.0:13.9:0.2. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 13 S/cm. Moreover, when a nitrogen content in the powder was quantitated by the chemical analysis, the nitrogen content was 0.05 wt %.

Comparative Example 3-3

In Comparative example 3-3, a sample was obtained in a similar way to Example 3-1 except that the commercially available calcium carbonate powder (specific surface area: 5.5 m²/g), the commercially available aluminum oxide powder (specific surface area: 141 m²/g) and the commercially available aluminum nitride powder (specific surface area: 2.6 m²/g) were weighed in a molar ratio of 12.0:6.0:2.0. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 80 S/cm. Moreover, when a nitrogen content in the powder was quantitated by the chemical analysis, the nitrogen content was 1.19 wt %.

Comparative Example 3-4

In Comparative example 3-4, a sample was obtained in a similar way to Example 3-1 except that the commercially available calcium carbonate powder (specific surface area: 5.5 m²/g), the commercially available aluminum oxide powder (specific surface area: 141 m²/g) and the commercially available aluminum nitride powder (specific surface area: 2.6 m²/g) were weighed in a molar ratio of 12.0:7.0:0.0, and that the treatment of cooling down the carbon furnace to the room temperature after performing the melting treatment at 1600° C. for one hour in the dry argon atmosphere was performed two times. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed (FIG. 4). Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 5 S/cm. Moreover, when a nitrogen content in the powder was quantitated by the chemical analysis, the nitrogen content was 0.03 wt %.

Comparative Example 4-1

In Comparative example 4-1, a sample was obtained in a similar way to Example 4-1 except that the carbon furnace was cooled down to the room temperature after the melting treatment was performed at 1600° C. for 12 hours in the dry nitrogen atmosphere. The graphite sheet on the surface of the molten coagulation was removed by the machining. Thereafter, the sample thus obtained was crushed, a part thereof was further crushed into powder, and a phase of the powder was determined by the X-ray diffraction. Then, a C12A7 phase was observed. Moreover, this powder exhibited a deep green color. Furthermore, conduction of a fractured surface of the crushed sample was investigated by the commercially available tester or the commercially available megohmmeter. Then, the conduction was recognized, and conductivity of the fractured surface was 75 S/cm. Moreover, when a nitrogen content in the powder was quantitated by the chemical analysis, the nitrogen content was 1.22 wt %.

These results are summarized in Table 1 to Table 3.

C12A7 polycrystals become 125 S/cm or more in the case of performing the treatment of cooling down the carbon furnace to the room temperature after performing the melting treatment at 1600° C. for one hour in the dry nitrogen atmosphere two to eight times.

(2) As obvious from comparison between the C12A7 polycrystals of Examples 2-1 to 2-5 and Comparative examples

TABLE 1

| | AlN Additive [wt %] | Atmosphere gas | Number of melting times | Nitrogen content [wt %] | Generated phase | Conductivity [S/cm] |
|---|---|---|---|---|---|---|
| Example 1-1 | 0 | Nitrogen | 2 | 0.34 | C12A7 | 125 |
| Example 1-2 | 0 | Nitrogen | 4 | 0.79 | C12A7 | 190 |
| Example 1-3 | 0 | Nitrogen | 8 | 0.96 | C12A7 | 130 |
| Example 2-1 | 0.6 | Nitrogen | 1 | 0.32 | C12A7 | 120 |
| Example 2-2 | 1.2 | Nitrogen | 1 | 0.45 | C12A7 | 150 |
| Example 2-3 | 2.3 | Nitrogen | 1 | 0.61 | C12A7 | 180 |
| Example 2-4 | 2.6 | Nitrogen | 1 | 0.73 | C12A7 | 200 |
| Example 2-5 | 3.5 | Nitrogen | 1 | 1.10 | C12A7 | 110 |
| Example 3-1 | 1.6 | Argon | 1 | 0.31 | C12A7 | 105 |
| Example 3-2 | 2.3 | Argon | 1 | 0.49 | C12A7 | 170 |
| Example 3-3 | 4.8 | Argon | 1 | 0.92 | C12A7 | 140 |
| Comparative example 1-1 | 0 | Nitrogen | 1 | 0.23 | C12A7 | 50 |
| Comparative example 1-2 | 0 | Nitrogen | 12 | 1.15 | C12A7 | 95 |
| Comparative example 2-1 | 0.3 | Nitrogen | 1 | 0.25 | C12A7 | 65 |
| Comparative example 2-2 | 5.9 | Nitrogen | 1 | 1.35 | C12A7 | 50 |
| Comparative example 3-1 | 0 | Argon | 1 | Less than 0.01 | C3A + CA | Not measured |
| Comparative example 3-2 | 0.3 | Argon | 1 | 0.05 | C12A7 | 13 |
| Comparative example 3-3 | 5.9 | Argon | 1 | 1.19 | C12A7 | 80 |
| Comparative example 3-4 | 0 | Argon | 2 | 0.03 | C12A7 | 5 |

TABLE 2

| | Total melting time | Atmosphere gas | Number of melting times | Nitrogen content | Generated phase | Conductivity |
|---|---|---|---|---|---|---|
| Example 4-1 | 2 h | $N_2$ | One time | 0.33 wt % | C12A7 | 123 S/cm |
| Example 4-2 | 4 h | $N_2$ | One time | 0.49 wt % | C12A7 | 169 S/cm |
| Example 4-3 | 8 h | $N_2$ | One time | 0.93 wt % | C12A7 | 130 S/cm |
| Example 4-4 | 2 h | $N_2$ | Two times | 0.40 wt % | C12A7 | 125 S/cm |
| Example 4-5 | 4 h | $N_2$ | Two times | 0.47 wt % | C12A7 | 155 S/cm |
| Example 4-6 | 8 h | $N_2$ | Two times | 1.01 wt % | C12A7 | 122 S/cm |
| Comparative example 4-1 | 12 h | $N_2$ | One time | 1.22 wt % | C12A7 | 75 S/cm |
| Comparative example 1-1 | 1 h | $N_2$ | One time | 0.23 wt % | C12A7 | 50 S/cm |
| Comparative example 1-2 | 12 h | $N_2$ | 12 times | 1.15 wt % | C12A7 | 95 S/cm |

TABLE 3

| | Annealing time | Atmosphere gas | Melting time | Nitrogen content | Generated phase | Conductivity |
|---|---|---|---|---|---|---|
| Example 5-1 | 24 h | $N_2$ | 1 h | 0.32 wt % | C12A7 | 121 S/cm |
| Example 5-2 | 48 h | $N_2$ | 1 h | 0.71 wt % | C12A7 | 186 S/cm |
| Example 5-3 | 24 h | $N_2$ | 4 h | 0.67 wt % | C12A7 | 216 S/cm |
| Example 5-4 | 48 h | $N_2$ | 4 h | 0.85 wt % | C12A7 | 220 S/cm |
| Comparative example 1-1 | 0 h | $N_2$ | 1 h | 0.23 wt % | C12A7 | 50 S/cm |
| Example 4-2 | 0 h | $N_2$ | 4 h | 0.49 wt % | C12A7 | 169 S/cm |

(Evaluation)

A description will be made of findings obtained from the C12A7 polycrystals of Examples and Comparative examples, which are described above.

(1) As obvious from comparison between the C12A7 polycrystals of Examples 1-1 to 1-3 and Comparative examples 1-1 and 1-2, it was confirmed that the conductivities of the 2-1 and 2-2, it was confirmed that the conductivities of the C12A7 polycrystals become 110 S/cm or more in the case of performing the melting/coagulation treatment in the dry nitrogen atmosphere and controlling the loadings of the alumina nitride powder within the range of 0.6 to 3.5 wt %.

(3) As obvious from comparison between the C12A7 polycrystals of Examples 3-1 to 3-3 and Comparative examples 3-1 and 3-4, it was confirmed that the conductivities of the C12A7 polycrystals become 105 S/cm or more in the case of performing the melting/coagulation treatment in the dry argon gas atmosphere and controlling the loadings of the alumina nitride powder within the range of 1.6 to 4.8 wt %.

(4) As obvious from comparison between the C12A7 polycrystals of Examples 1-1 to 1-3 and Examples 2-1 to 2-5 and 3-1 to 3-3, it was confirmed that the C12A7 polycrystals having high conductivities are obtained by the melting/coagulation treatment performed one time regardless of the atmosphere. In accordance with the conventional production method of the C12A7 polycrystal, the melting/coagulation treatment has had to be performed two times. Accordingly, in accordance with the conventional production method, it has been impossible to reduce production cost of the C12A7 polycrystal, and to produce the C12A7 polycrystal having the conductivity with high productivity. Hence, in accordance with the production method of the present invention, it is possible to produce the C12A7 polycrystal having the conductivity with high productivity since the number of times that the melting/coagulation treatment is performed becomes one.

Figure 6:
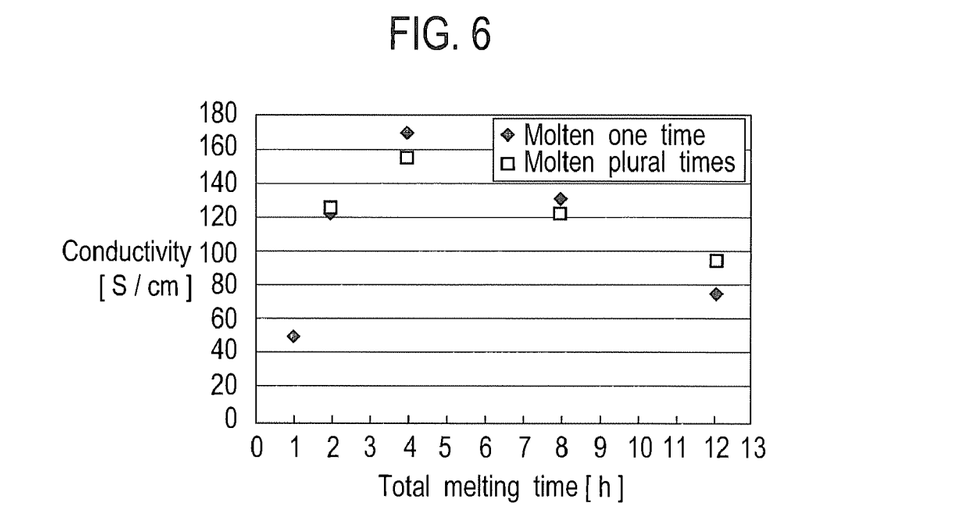
FIG. 6 is a conductivity graph of C12A7 polycrystals of Examples 4-1 to 4-6 and Comparative examples 1-1, 1-2 and 4-1.

(5) As obvious from comparison between the C12A7 polycrystals of Examples 4-1 to 4-6 and Comparative examples 1-1, 1-2 and 4-1 (refer to FIG. 6), it was confirmed that the conductivities of the C12A7 polycrystals become 122 S/cm or more in the case of performing the melting/coagulation treatment for two to eight hours in the dry nitrogen atmosphere.

Figure 7:
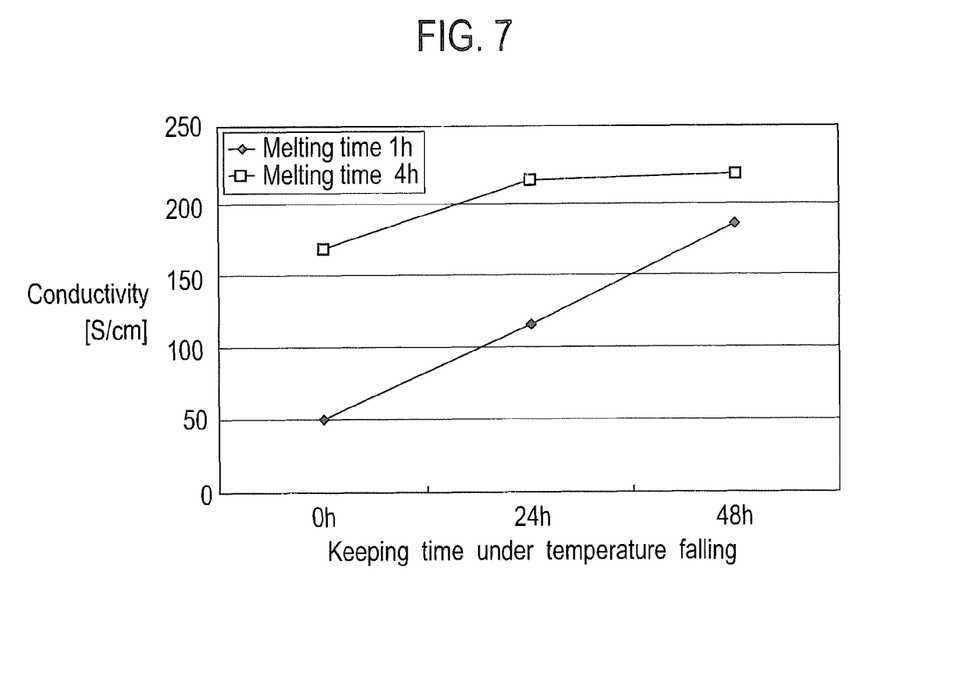
FIG. 7 is a conductivity graph of C12A7 polycrystals of Examples 5-1 to 5-4 and Comparative examples 1-1 and 4-2.

(6) As obvious from comparison between the C12A7 polycrystals of Examples 4-2, 5-1 to 5-4 and Comparative examples 1-1 (refer to FIG. 7), it was confirmed that the conductivities of the C12A7 polycrystals become 121 S/cm or more in the case of performing the annealing treatment in the dry nitrogen atmosphere.

Figure 8:
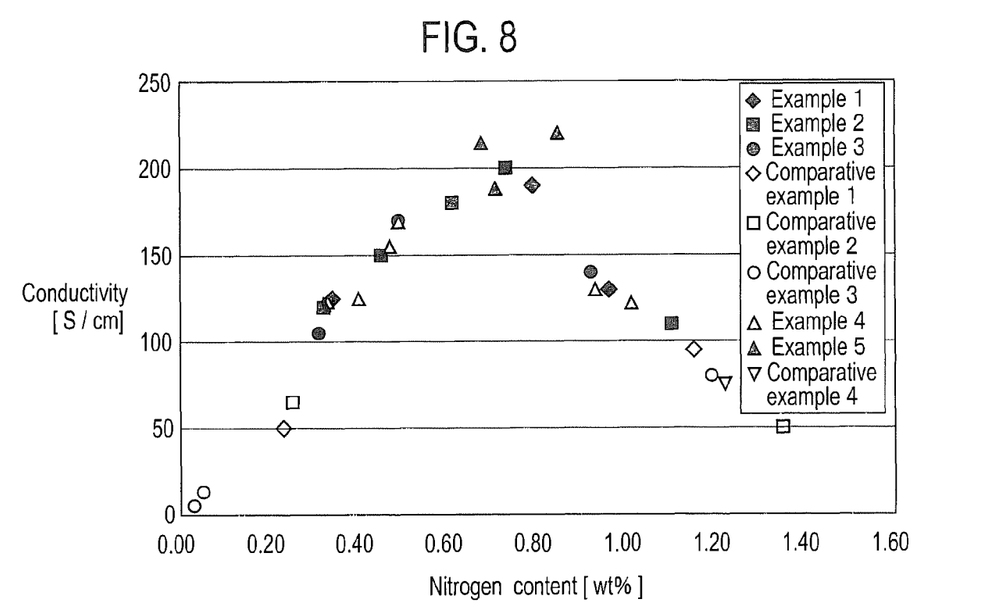
FIG. 8 is a graph showing a relationship between nitrogen contents and conductivities in the C12A7 polycrystals of Examples and Comparative examples.

(7) FIG. 8 is a graph showing a relationship between the nitrogen contents and the conductivities in the C12A7 polycrystals of Examples and Comparative examples, which are plotted with reference to Table 1 to Table 3. As obvious from this graph, the conductivities of the C12A7 polycrystals become 100 S/cm or more by controlling the nitrogen contents within the range of 0.3 to 1.1 wt %, and the conductivities become 150 S/cm or more by controlling the nitrogen contents within the range of 0.5 to 0.9 wt %. These values of the conductivities are obviously higher than those of the conductivities of the C12A7 polycrystals, which have been reported heretofore. From this fact, it was found out that the $12CaO \cdot 7Al_2O_3$ polycrystal having high conductivity can be produced by containing the nitrogen in the C12A7 polycrystal and further controlling the nitrogen content within the predetermined range.

The description has been made above of the embodiments to which the invention made by the inventors thereof is applied; however, the present invention is not limited by the description and the drawings, which are according to the embodiments and form a part of the disclosure of the present invention. It is additionally noted here that, naturally, other embodiments, examples, operation technologies and the like, which are made by those skilled in the art based on the above-described embodiments, are entirely incorporated in the scope of the present invention.

What is claimed is:

1. A conductive ceramic material, comprising:
    nitrogen in an amount of 0.3 wt % to 1.1 wt %,
    wherein a composition of the conductive ceramic material is $12CaO \cdot 7Al_2O_3$ in oxide conversion.

2. A method for producing a conductive ceramic material, comprising the steps of:
    pouring calcium source powder and aluminum source powder into a crucible;
    mounting a cap on an opening portion of the crucible;
    introducing the crucible having the cap mounted thereon into a melting furnace; and
    repeatedly performing, plural times, treatment of melting the calcium source powder and the aluminum source powder in a dry nitrogen atmosphere in the crucible and cooling and coagulating melted calcium source powder and melted aluminum source powder in a dry nitrogen atmosphere in the crucible;
    whereby the conductive ceramic material produced thereby comprises nitrogen in an amount of 0.3 wt % to 1.1 wt % and has a composition of $12CaO \cdot 7Al_2O_3$ in oxide conversion.

3. The method for producing a conductive ceramic material according to claim 2, wherein the treatment of melting the calcium source powder and the aluminum source powder in a dry nitrogen atmosphere in the crucible and cooling and coagulating melted calcium source powder and melted aluminum source powder in a dry nitrogen atmosphere in the crucible are repeatedly performed two times to eight times.

4. A method for producing a conductive ceramic material, comprising the steps of:
    pouring, into a crucible, calcium source powder and aluminum source powder to which at least aluminum nitride is added;
    mounting a cap on an opening portion of the crucible;
    introducing the crucible having the cap mounted thereon into a melting furnace; and
    performing treatment of melting the calcium source powder and the aluminum source powder in either of a dry nitrogen atmosphere and a dry argon atmosphere in the crucible and cooling and coagulating melted calcium source powder and melted aluminum source powder in either of a dry nitrogen atmosphere and a dry argon atmosphere in the crucible;
    whereby the conductive ceramic material produced thereby comprises nitrogen in an amount of 0.3 wt % to 1.1 wt % and has a composition of $12CaO \cdot 7Al_2O_3$ in oxide conversion.

5. The method for producing a conductive ceramic material according to claim 4, wherein the aluminum nitride is added within a range of 0.6 wt % or more to 3.5 wt % or less in a case of cooling the crucible and coagulating the calcium source powder and the aluminum source powder in the crucible in the dry nitrogen atmosphere.

6. The method for producing a conductive ceramic material according to claim 4, wherein the aluminum nitride is added within a range of 1.6 wt % or more to 4.8 wt % or less in a case of cooling the crucible and coagulating the calcium source powder and the aluminum source powder in the crucible in the dry argon atmosphere.

7. A method for producing a conductive ceramic material, comprising the steps of:
    pouring calcium source powder and aluminum source powder into a crucible;
    mounting a cap on an opening portion of the crucible;
    introducing the crucible having the cap mounted thereon into a melting furnace; and
    performing treatment of melting the calcium source powder and the aluminum source powder for two hours or more in a dry nitrogen atmosphere in the crucible and cooling and coagulating melted calcium source powder and melted aluminum source powder in a dry nitrogen atmosphere in the crucible;

whereby the conductive ceramic material produced thereby comprises nitrogen in an amount of 0.3 wt % to 1.1 wt % and has a composition of $12CaO.7Al_2O_3$ in oxide conversion.

8. The method for producing a conductive ceramic material according to claim 7, wherein the calcium source powder and the aluminum source powder are melted for two hours or more to eight hours or less and coagulated melted calcium source powder and melted aluminum source powder in the dry nitrogen atmosphere in the crucible.

9. A method for producing a conductive ceramic material, comprising the steps of:

pouring calcium source powder and aluminum source powder into a crucible;

mounting a cap on an opening portion of the crucible;

introducing the crucible having the cap mounted thereon into a melting furnace;

performing treatment of melting the calcium source powder and the aluminum source powder in a dry nitrogen atmosphere in the crucible and cooling and coagulating melted calcium source powder and melted aluminum source powder in a dry nitrogen atmosphere in the crucible; and annealing a coagulation, which is obtained by the treatment, in the dry nitrogen atmosphere;

whereby the conductive ceramic material produced thereby comprises nitrogen in an amount of 0.3 wt % to 1.1 wt % and has a composition of $12CaO.7Al_2O_3$ in oxide conversion.

10. The method for producing a conductive ceramic material according to claim 9, wherein a time of annealing the coagulation in the dry nitrogen atmosphere is 24 hours or more.

11. The method for producing a conductive ceramic material according to claim 10, wherein a temperature of annealing the coagulation in the dry nitrogen atmosphere is within a range of 1350° C. or more to 1450° C. or less.

12. The method for producing a conductive ceramic material according to claim 9, wherein a temperature of annealing the coagulation in the dry nitrogen atmosphere is within a range of 1350° C. or more to 1450° C. or less.

\* \* \* \* \*